(No Model.)

M. THOMAS.
COFFEE POT.

No. 255,697. Patented Mar. 28, 1882.

Witnesses:
D. H. van Sleet
A. N. Ackley

Inventor.
Merton Thomas

UNITED STATES PATENT OFFICE.

MERTON THOMAS, OF HIMROD'S, NEW YORK.

COFFEE-POT.

SPECIFICATION forming part of Letters Patent No. 255,697, dated March 28, 1882.

Application filed August 25, 1881. (No model.)

*To all whom it may concern:*

Be it known that I, MERTON THOMAS, a citizen of the United States, residing at Himrod's, in the county of Yates and State of New York, have invented a new and useful Adjustable Coffee-Settler, &c., of which the following is a specification.

My invention relates to improvements in coffee-pots by means of an adjustable tin band which supports a wire-gauze or perforated tin cup by means of three adjustable flexible arms and a sliding rod, which wire-gauze cup is used as a receptacle for the "drawing" of coffee; and the objects of my improvements are, first, to afford proper facilities for the adjustment of my device to any coffee-pot, whatever may be its depth or the diameter of its rim; second, to provide a means for the extraction of the substance of the coffee by means of the wire-gauze or perforated tin cup, which allows the water in which the coffee is boiled to reach it, at the same time preventing the admixture of the dregs of coffee with the liquid extract. I attain these objects by the mechanism illustrated in the accompanying drawings, in which—

Figure 1:
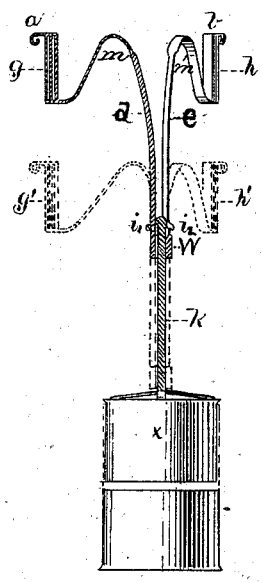
Figure 2:
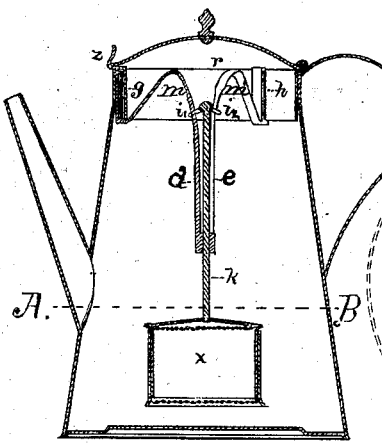
Figure 3:
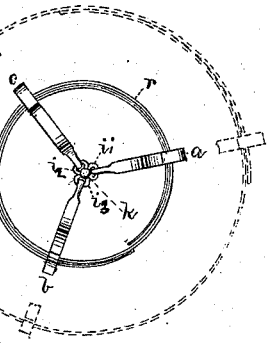
Figure 4:
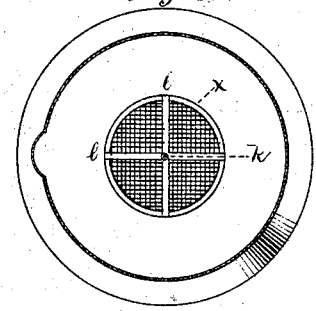
Figure 5:
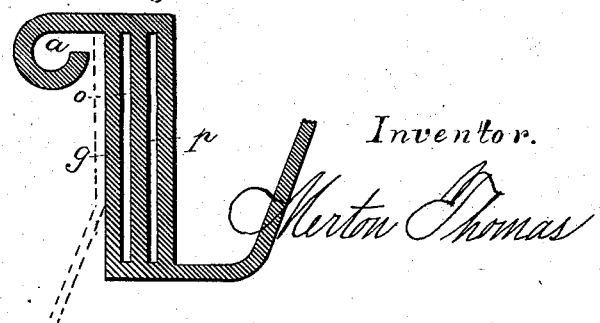

Figure 1 is a vertical section of the improvement with the exception of the adjustable tin band. Fig. 2 is a vertical section of the coffee-pot, showing substantially similar parts of the device as shown in Fig. 1. Fig. 3 is a surface plan, showing the adjustable tin band $r$ in its maximum and minimum positions together with the upper portion of the three adjustable arms and band-supporters. Fig. 4 is a cross-section of the coffee-pot at the line A B, as shown in Fig. 2, showing upper part of circular cup, and the manner of its attachment to the lower end of the adjustable sliding rod. Fig. 5 is a section of one of the holders of the adjustable tin band, being an enlargement of the parts $g$ $a$ of Fig. 1.

Similar letters refer to similar parts throughout the several views.

My invention consists of three flexible bent wire arms, $d$ $e$ $f$, as shown in Fig. 1. These arms are secured together at their lower ends, $w$, through which passes the sliding rod $k$. The upper end of the sliding rod $k$ has attached to it three loops, $i'$ $i^2$ $i^3$, through each of which passes one of the three flexible bent wire arms $d$ $e$ $f$, thus allowing the cup $x$ to be raised or lowered according to the depth of the coffee-pot, as shown by the respective positions of the flexible bent wire arms $d$ $e$ $f$, with band-holders $g$ $h$ $i$, as seen in dotted lines in the position $g'$ $h'$ $i'$ in Fig. 1. The bent flexible wire arms terminate in rests $a$ $b$ $c$ for the purpose of preventing the device from dropping into the coffee-pot. Each of the flexible bent wire arms $d$ $e$ $f$ also has near its upper end two narrow slots, $o$ $p$, as seen in Fig. 5, through which passes the annular tin band $r$, which may be increased or diminished in diameter, as shown in Fig. 3, by its passing through the slots in the upper ends of the bent wire arms at the points $g$ and $h$. The upper end of one of the three rests is bent upward, forming the latch $z$, as shown in Fig. 2, for the purpose of fastening down the lid of the coffee-pot. The latch $z$, together with the hinge of the lid, is sufficient to securely hold the lid in its proper position without the usual inner rim.

The cup $x$ is circular in form, and the top and bottom are made of wire-gauze or perforated tin. The wire-gauze cup $x$ is attached to the lower end of the sliding rod at the point $k$ by means of the cross-supports $l$ $l$, as shown in Fig. 4.

What I claim as my invention, and desire to secure by Letters Patent, is—

1. The sliding rod $k$, provided with loops $i'$ $i^2$ $i^3$ at its upper extremity, in combination with the cup $x$ and the arms $d$ $e$ $f$, so that by sliding the rod up or down the apparatus may be used in pots of different depths, substantially as shown.

2. The flexible wire rods $d$ $e$ $f$, curved at the upper part, at $m$, to admit of extension and contraction, in combination with the slotted band-holders $g$ $h$ $i$ and with the loops $i'$ $i^2$ $i^3$ of the sliding rod $k$, substantially as and for the purpose described.

3. The band-holders $g$ $h$ $i$, each provided with slots $o$ $p$ $o'$ $p'$, for holding the coils of the circular band $r$, in combination with the projections or rests $a$ $b$ $c$, resting upon the upper edge of the pot, and with the arms $d$ $e$ $f$, for holding the coils of the circular band, as and for the purpose substantially as set forth.

4. The annular band $r$, arranged in coils and passing through the slots $o$ $p$ of the band-supporters $g$ $h$ $i$, in combination with the band-supporters arranged, as described, so as to be held in circles of different sizes in order that it may hold in its turn the rests $a$ $b$ $c$ in positions to fit pots of different diameters, substantially as shown and described.

5. In a coffee-pot, the combination of the receptacle $x$ and its sliding rod $k$, loops $i'$ $i^2$ $i^3$, flexible arms $d$ $e$ $f$, band-supporters $g$ $h$ $i$, slots $o$ $p$, band $r$, and spring-catch $z$, all arranged to operate as above shown and described.

MERTON THOMAS.

Witnesses:
D. F. VAN VLEET,
A. N. ACKLEY.